United States Patent [19]

Moriguchi et al.

[11] 4,454,516
[45] Jun. 12, 1984

[54] HEAT-SENSITIVE RECORDING DEVICE

[75] Inventors: Haruhiko Moriguchi; Takashi Ohmori; Toshiharu Inui, all of Kanagawa, Japan

[73] Assignee: Fuji Xerox Co., Ltd., Tokyo, Japan

[21] Appl. No.: 358,951

[22] Filed: Mar. 17, 1982

[30] Foreign Application Priority Data

Mar. 19, 1981 [JP] Japan .................................. 56-38712

[51] Int. Cl.³ .......................................... G01D 15/10
[52] U.S. Cl. ................................. 346/76 PH; 219/216
[58] Field of Search .................. 400/120; 346/76, 1.1; 219/216 PH

[56] References Cited

U.S. PATENT DOCUMENTS 3,913,719 10/1975 Frey ................................. 346/1.1 X
3,984,844 10/1976 Tanno et al. .................... 346/76 PH
4,224,869 9/1980 Morin ......................... 346/76 PH X Primary Examiner—Donald A. Griffin
Attorney, Agent, or Firm—Sughrue, Mion, Zinn, Macpeak & Seas

[57] ABSTRACT

A heat-sensitive recording apparatus includes a two-stage buffer memory for storing input video signals corresponding to one line, and a counter which determines the proportion of "black" signals in one line as the signals are input thereto. Whether printing of the line is to be carried out in one or plural operations is determined by the determined proportion, and a signal indicative of the number of operations is outputted to a block driver prior to the time when the corresponding video signals are outputted by the second stage of the buffer memory to a shift register.

11 Claims, 4 Drawing Figures

HEAT-SENSITIVE RECORDING DEVICE

BACKGROUND OF THE INVENTION

This invention relates to a heat-sensitive recording head having a drive means which drives a plurality of heat generating elements on a heat-sensitive recording head simultaneously, or in plural groups, according to the number of picture elements to be printed for one line.

In a heat-sensitive recording device with a heat-sensitive recording head, video signals are successively stored in the heat-sensitive recording head itself, or in a shift register provided separately, and data are recorded by causing the heat-generating elements on the heat-sensitive recording head to generate heat according to the video signals thus stored.

FIG. 1 shows the arrangement of a conventional heat-sensitive recording device of this type. A received signal 1 transmitted through a transmission path is written in a buffer memory 2 which stores the video signals of each line. A sequencer 3 operates to control the operation of the heat-sensitive recording device. More specifically, the sequencer 3 applies a reading control signal 4 to the buffer memory 2 with predetermined timing, so that a video signal 5 is read out of the buffer memory 2. The video signal 5 is applied to a shift register 6 which stores the video signals of one line. That is, the video signals 5 are read out of the buffer memory 2 in response to the control signals 4 and are successively applied to the shift register 6. At the same time, the sequencer 3 applies a drive control signal 8 to a block drive system 7 to control the latter.

The shift register 6 is a circuit element for converting a series signal into a parallel signal. Lead wires 9 connected to the output of the shift register 6 are divided into a plurality of blocks (or groups) which are connected to the input terminals of switching circuits $11_1$ through $11_n$ (n being an integer). These switching circuits $11_1$ through $11_n$ are connected to a common power source 12. In response to timing pulses $13_1$ through $13_n$ from the block drive system 7, voltages corresponding to the video signals are applied to lead wires 14 which are connected to switch output terminals. The other end of the lead wires 14 are connected to the first ends of heat generating elements 16 arranged on a heat-sensitive recording head 15, respectively, and the second ends of the heat generating elements 16 are grounded. The heat generating elements, to which the voltage is applied because of the presence of a video signal to be printed, generate heat. On the other hand, the heat generating elements, to which no voltage is applied because of the absence of a video signal to be printed, generate no heat, being maintained at the earth potential. Accordingly, as a heat-sensitive recording sheet is run in a direction perpendicular to the line of the heat generating elements 16, video data are recorded thereon by the selective heat generation of the heat generating elements 16.

In the conventional heat-sensitive recording device described above, the recording operation of one line is divided into a plurality of recording operations with the aid of the block drive system 7, in order to limit the maximum number of heat generating elements operated at a time, thereby to reduce the maximum power consumption and to set the dimension and cost of the power source 12 within predetermined ranges. However, in recording an ordinary original, the area which includes no data to be printed (hereinafter referred to as the background area, when applicable) is much larger than the area which includes data to be printed, and the device described above suffers from a drawback in that the power capacity is not economically used. Furthermore, as the recording operation of each line is divided into a plurality of recording operations as was described above, it is difficult to increase the recording speed.

FIG. 2 shows the arrangement of a heat-sensitive recording device which has been proposed to solve the above-described problems. In FIG. 2, those components which have been described with reference to FIG. 1 are therefore similarly numbered. In the device, the video signal 5 of one line from the buffer memory 2 is applied to the shift register 6 and to a counter 18 simultaneously. The counter 8 counts a video signal (a black video signal) which is included in the video signal of one line and is to be printed. Upon completion of the counting operation, the counter 18 applies a division specifying signal 19 to a sequencer 21 in correspondense to the count value. Thereupon, the sequencer 21 changes the drive control signal 8, to specify the number of recording operations which the block drive system is to carry out in recording one line. For instance in the case where the ratio of black video signals to be printed to the number of video signals of one line is less than $\frac{1}{4}$, the sequencer 21 causes the block drive system 7 to output all the timing pulses $13_1$ through $13_n$ at the same time, so that one line is recorded simultaneously, i.e., in one recording operation. In the case where the proportion of black video signals is larger than $\frac{1}{4}$ (inclusive) and smaller than $\frac{1}{2}$, the sequencer 21 causes the block drive system 7 to firstly output some of the timing pulses $13_1$ through $13_n$ and then the remaining number, so that one line is recorded by two recording operations. In the case where the proportion is larger than $\frac{1}{2}$ (inclusive), the block drive system 7 outputs the timing pulses $13_1$ through $13_n$ in four groups, so that one line is recorded by four printing operations.

However, in this proposed heat-sensitive recording device, the recording division number cannot be discriminated until the video signals of one line have been completely counted and set in the shift register 6. Therefore, the transmission of a busy signal for temporarily suspending the video signal transmission is delayed. Accordingly, the buffer memory 2 must have a larger capacity than is conventional. This is a problem involved in the conventional heat-sensitive recording device.

Furthermore, in the conventional heat-sensitive recording device, the recording division number varies for every line, and accordingly the recording time varies for every line. Accordingly, after the recording division number has been discriminated, a drive pulse for moving the heat-sensitive recording sheet to the next auxiliary scanning position is applied to the sheet feeding motor. Therefore, even in the case where a line can be recorded by a single recording operation, a method cannot be employed in which, before the recording operation starts, the drive pulse is produced with the response time of the sheet feeding motor taken into account. Thus, the recording speed cannot be sufficiently increased.

SUMMARY OF THE INVENTION

In view of the foregoing, an object of this invention is to provide a heat-sensitive recording device in which the above-described problems have been solved by employing a system in which the recording division number is changed according to the number of picture elements to be recorded in one line.

In the invention, video signals to be printed are counted before being transferred to the shift register from the buffer memory, to achieve the foregoing object.

DETAILED DESCRIPTION OF THE PREFERRED EMBODIMENTS

Figure 1:
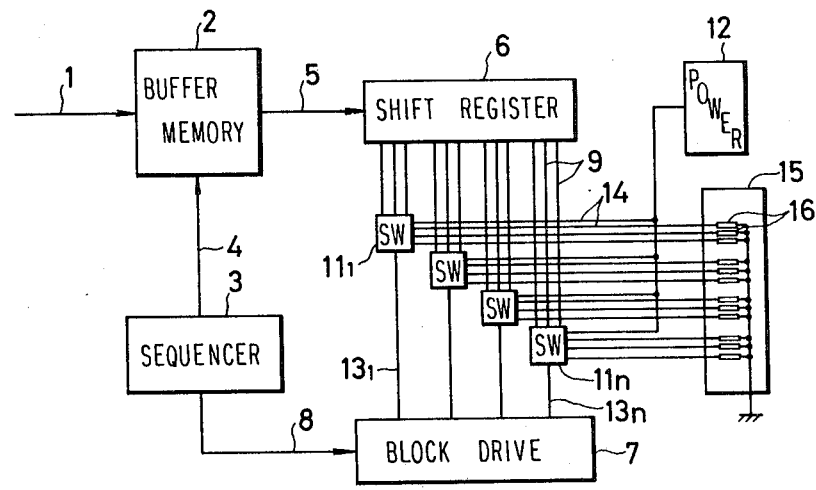
FIG. 1 is a block diagram outlining the arrangement of a conventional heat-sensitive recording device.
Figure 2:
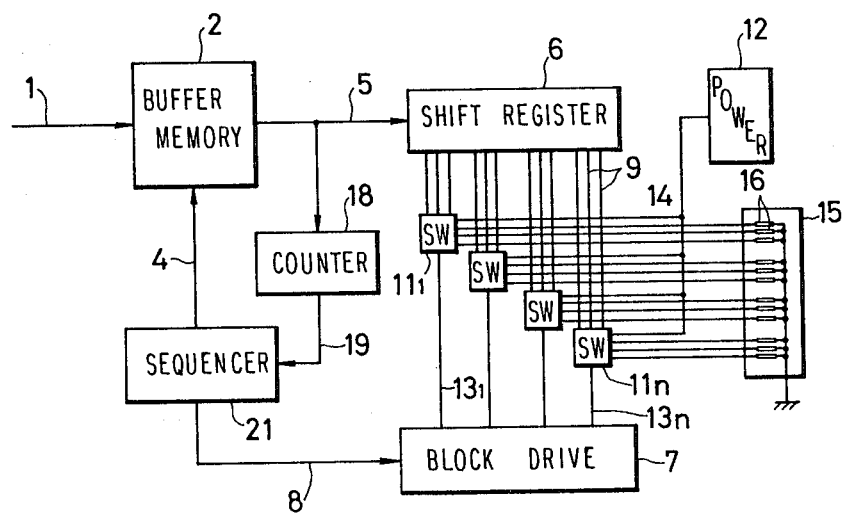
FIG. 2 is a block diagram outlining the arrangement of a heat-sensitive recording device which has been proposed to eliminate drawbacks accompanying the device in FIG. 1.
Figure 3:
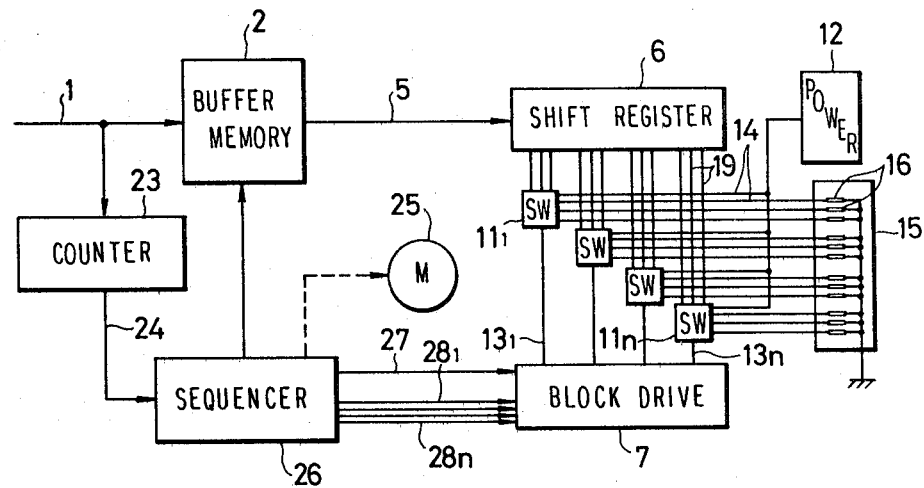
FIG. 3 is a block diagram outlining the arrangement of a heat-sensitive recording device according to one embodiment of this invention.

FIG. 3 shows the arrangement of a heat-sensitive recording device according to the invention. In FIG. 3, those components which have been described with reference to FIG. 1 or FIG. 2 are therefore similarly numbered. The device of the invention includes a counter 23 for counting the received signals for every line; and a sequencer 26 for controlling the operations of the block drive system 7 and a sheet feeding motor 25 in response to a division specifying signal 24 from the counter 23.

When a received signal 1 is applied to the buffer memory 2, the counter 23 operates to count the black video signals for one line which are included in the received signal 1. After counting the black video signals for one line, the counter determines whether or not the proportion of the black video signals to all the video signals is larger than $\frac{1}{4}$. In the case when the proportion is $\frac{1}{4}$ or less, the counter 23 applies a low level signal, as a division specifying signal 24, to the sequencer 26. In the other case, the counter 23 applies a high level signal to the sequencer 26, and transmits a busy signal to a unit on the transmission side. Upon reception of the busy signal, the unit on the transmission side suspends the original reading operation or the original moving operation for a predetermined period of time. In this case, instead of such a suspending operation, a method may be employed in which the read video signals are stored in a memory.

The buffer memory 2 has two memory regions, each storing video signals for one line, so that while the received signals for one line are being stored in one of the two memory regions, the received signals for the previous line which were stored in the other memory region before are outputted as video signals 5. Accordingly, with respect to the video signals 5 for a given line which are outputted by the buffer memory 2, the sequencer 26 has received the division specifying signal 24 before the video signals 5 are outputted.

When the division specifying signal 24 is the low level signal, the sequencer 26 applies a drive pulse to a sheet feeding motor 25 a predetermined period of time before the video signals for one line are set in the shift register 6. When all the video signals for one line have been set in the shift register 6, the sequencer 26 applies a clock pulse signal 27 to the block drive system 27 and simultaneously applies section signals to group selection lines $28_1$ through $28_n$. Thereupon, in synchronization with the clock pulse 27, the block drive system 7 outputs the timing pulses $13_1$ through $13_n$ at the same time to energize all the switching circuits $11_1$ through $11_n$, so that one line is recorded by one recording operation. Immediately after the recording operation has been accomplished, the sheet feeding motor 25 is driven by the aforementioned drive pulse, so that the heat-sensitive recording sheet is moved to the next recording position.

In the case where, on the other hand, the division specifying signal 24 supplied to the sequencer 26 is the high level signal, the sequencer 26 produces the drive pulse at an instant, which is later by a period of time required for n recording operations, than the instant of time of the above-described drive pulse application. When all the video signals for one line have been set in the shift register 6, the sequencer 26 applies the selection signals to the group selection lines $28_1$ through $28_n$ successively in response to the production of the clock pulse signals 27, respectively. In synchronization with the clock pulse signals 27, the block drive system 7 outputs the timing pulses $13_1$ through $13_n$ one at a time to activate corresponding switching circuits $11_1$ through $11_n$. Therefore, in the case where the proportion of black video signals in the video signals for one line is larger than $\frac{1}{4}$, one line is recorded by n recording operations.

Figure 4:
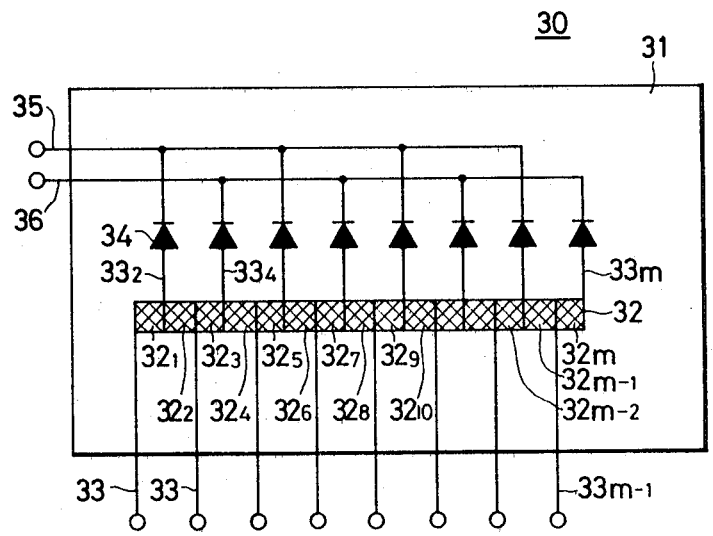
FIG. 4 is an explanatory diagram illustrating a heat-sensitive recording head using a heat generating element assembly.

FIG. 4 shows a heat-sensitive recording head using a heat generating element assembly comprising a series of heat generating elements. The heat generating element assembly 32 is in the form of one line and is provided on a substrate 31. A number of reed electrodes $33_1$ through $33_m$ (m being an even integer) extend from the heat generating element assembly 32 alternately in opposite directions and at equal intervals. Among the reed electrodes $33_1$ through $33_m$, the even-number reed electrodes $33_2$, $33_4$, $33_6$ and so on are connected through diodes 34 to common lead lines 35 and 36. More specifically, every other even-numbered reed electrode $33_2$, $33_6$, $33_{10}$ and so on is connected through the diodes 34 to the common lead line 35, and the remaining even-numbered reed electrodes $33_4$, $33_8$ and so on are connected through the diodes 34 to the common lead line 36. In the heat-sensitive recording head 30 thus constructed, when the lead wires 35 and 36 are activated alternately with the output video signals of the switching circuits supplied to the odd-number reed electrodes $33_1$, $33_3$, ... and $33_{m-1}$, the heat generating elements forming the heat generating element assembly 32 are selectively caused to generate heat. That is, in the case when the lead wire 35 is activated, the heat generating elements $(32_1, 32_2), (32_5, 32_6), (32_9, 32_{10}) \ldots$ and $(32_{m-2}, 32_{m-1})$ generate heat according to the video signals (applied voltages), and in the case when the lead wire 36 is activated, the remaining heat generating elements generate heat according to the video signals.

The above-described heat-sensitive recording head may be applied, as one modification of the above-described embodiment, to the heat-sensitive recording device of the invention. In this case, the received signals 1 are divided into a group of received signals which are used for recording when the lead wire 35 is activated, and a group of received signals which are used for recording when the lead wire 36 is activated, and the counter 23 counts the first group of received signals and the second group of received signals separately. The recording division number is determined from the count value which is larger, or two recording division numbers are determined for the two lead wires 35 and 36, to perform the recording oeration.

As is apparent from the above description, in the invention, the recording division number is determined before the video signals are transferred from the buffer memory to the shift register. Therefore, according to the invention, a heat-sensitive recording device higher in recording speed than the proposed conventional heat-sensitive recording device can be provided at a manufacturing cost which is lower than that of the latter.

In the above-described embodiment, the recording division number is changed in two steps according to the proportion of video signals to be printed; however, it goes without saying that it may be changed in three or more steps.

What is claimed is:

1. A heat-sensitive recording device, comprising: a buffer memory for temporarily storing a received video signal applied to an input port thereof; a shift register for storing a unitary group of video signal data outputted by said buffer memory; a thermal recording heat having a plurality of heat generating elements, said head carrying out recording in response to said unitary group of video signal data in one or plural printing operations; means for determining a proportion of data values in said unitary group representing dots to be printed, said determining means receiving and operating in response to said video signal applied to said input port of said buffer memory; and sequencer means for controlling a proportion of said heat generating elements activated at a time in accordance with a determination result provided by said determining means.

2. A heat-sensitive recording device as claimed in claim 1, said buffer memory having a plurality of memory regions.

3. A heat-sensitive recording device as claimed in claim 2, wherein, while received video signal data corresponding to a unitary group is being stored in one region of said buffer group is being stored in one region of said buffer memory, video signal data of the previous group is outputted to said shift register.

4. A heat-sensitive recording device as claimed in claim 3, said determining means comprising means for counting video signal values corresponding to dots to be printed.

5. A heat-sensitive recording device as claimed in claim 4, wherein said determination result is applied to said sequencer means at a time prior to the time at which video signal data forming a respective unitary group corresponding to said determination result are outputted by said buffer memory to said shift register.

6. A heat-sensitive recording device as claimed in either one of claims 4 and 5, wherein one activating operation of said heat generating elements is performed when said proportion of video signals to be printed is less than a predetermined threshold value, and plural activating operations are otherwise performed.

7. A heat-sensitive recording device as claimed in claim 1, said heat-sensitive recording head having a plurality of electrodes extending alternately from either side of a heat generating element assembly, and a pair of lead wires, said lead wires being connected alternatively to said electrodes extending from one of said sides.

8. A heat-sensitive recording device as claimed in claim 7, said lead wires being alternatively activated so as to allow one half of said heat generating elements to generate heat according to said video signal data, at a given time.

9. A heat-sensitive recording device as claimed in claim 8, wherein said determining means separately counts data values divided into groups used for recording when a respective lead wire is activated, respectively, said determination result being determination result being determined by the larger count value.

10. A heat-sensitive recording device as claimed in claim 8, wherein said determining means separately counts data values divided into groups used for recording when a respective lead wire is activated, respectively, said determination result being determined separately for the two lead wires.

11. A heat-sensitive recording device as claimed in claim 1, further including a sheet feeding motor, a drive pulse being applied to said motor by said sequencer at a predetermined time prior to the time at which said video signal data output from said buffer memory are set in said shift register.

* * * * *